S. S. JACKSON.
FEELER DEVICE FOR LOOMS.
APPLICATION FILED DEC. 27, 1915.

1,248,865.

Patented Dec. 4, 1917.
11 SHEETS—SHEET 7.

Witness:
Oscar F. Hill

Inventor:
Simeon S. Jackson
by Chas. F. Randall
Attorney

UNITED STATES PATENT OFFICE.

SIMEON S. JACKSON, OF BOSTON, MASSACHUSETTS, ASSIGNOR TO THE STAFFORD COMPANY, OF READVILLE, MASSACHUSETTS, A CORPORATION OF NEW JERSEY.

FEELER DEVICE FOR LOOMS.

1,248,865.   Specification of Letters Patent.   Patented Dec. 4, 1917.

Application filed December 27, 1915. Serial No. 68,650.

*To all whom it may concern:*

Be it known that I, SIMEON S. JACKSON, a subject of Great Britain, residing at Readville, Boston, in the county of Suffolk, State of Massachusetts, have invented a certain new and useful Improvement in Feeler Devices for Looms, of which the following is a specification, reference being had therein to the accompanying drawings.

The invention is an improvement in depletion-detecting and indicating devices, commonly termed feeler-devices, such as are employed in looms for the purpose of forestalling complete exhaustion of the supply of weft or filling contained in the working shuttle upon the lay of a loom. Devices of this class, in general, are contrived to detect the arrival of a predetermined stage in the progressive depletion of the said supply, and thereupon "indicate" or "call" a change in the operation of the loom, the change "indicated" or "called" involving in some cases automatic replenishment of the working weft-supply; in other cases, stoppage of the loom.

The invention, generally speaking, has relation to depletion-indicating, or weft-feeler, devices of the class having a laterally-movable feeler-tip which is held from lateral movement through engagement of the weft-mass with its feeling end so long as a safe amount of weft remains in the shuttle. More particularly, it has relation to those feeler-devices having a feeler-tip which is adapted to be displaced in the direction of the length of the weft-carrier contained in the shuttle by the contact-pressure against its feeling end, when the depletion of the weft-supply has progressed so far that the portion of the said weft-carrier which is presented to the said feeling end does not have thereon weft enough to keep such end from slipping along the weft-carrier.

The invention consists, firstly, in a new mode of giving to a laterally-movable feeler-tip its normal presentation-position for feeling action, and of providing for the movements of the feeler-tip and its carrier which are necessary during the regular working prior to substantial exhaustion, and also for those which are necessary for indicating or calling a change when the predetermined extent of exhaustion is detected.

The invention consists, secondly, in a new mode of governing through a feeler having a laterally-movable feeler-tip the so-called controller or transmitter of the feeler-devices of a loom.

The invention consists, thirdly, in automatic resetting means for the controller. The invention consists fourthly in means for preventing feeler-devices from acting unnecessarily to indicate or call a change while the loom in which such devices are employed is being turned over for pick-finding purposes with the shuttle removed from the lay.

The invention consists, in addition, in various other features to which reference will be made in the course of the following description.

In embodying the principles of the invention, the mechanical construction, as well as the arrangement of the parts, may be varied more or less to suit the views of the maker and user, and to meet the special needs in practice in the application and use of the feeler-devices in which the said principles are embodied. I usually support the laterally-movable feeler-tip upon a spring-backed movable carrier by pivoting the feeler-tip to the said carrier, and have so shown the same herein, but the invention in its broader phases is not limited in this respect.

I have shown herein illustrative embodiments of the principles of the invention in which the laterally-movable feeler-tips are arranged to be displaced laterally by the contact-pressure applied to their feeling-ends. Inasmuch as such principles are applicable in connection with feeler-tips which are movable laterally according to other known methods, it is to be understood that the claims that are made hereinafter are not necessarily restricted in all cases to feeler-tips of the pressure-displaced class.

Having reference to the illustrative embodiment which is shown in Figs. 1 to 5,—

In this embodiment the feeler-tip 1 is mounted upon the rear portion of a carrier 2 that is movable forwardly and rearwardly in a loom, as heretofore. The feeling end 1$^c$ of the feeler-tip is directed rearward. The usual openings 6 and 7 are provided in the shuttle-box front-plate and the front wall of the shuttle-body, respectively, to permit the said feeling end to enter the shuttle from the front side of the latter as the lay beats up, for the purpose of making contact with the said supply. The carrier 2, as usual, is actuated by a spring (9) which holds it normally in its rearmost position but yields to permit the carrier to be pushed forward by the pressure of the weft-contents of the shuttle against the feeling end of the feeler-tip as the lay approaches front center, and moves the carrier rearward to the normal position thereof again as the lay recedes. Different available forms, constructions, and arrangements of carriers and actuating springs, and different modes and means of supporting the carriers with capacity for the required movements, are known in the art and in some cases may be substituted for those herein shown. In this instance, the carrier is in the form of a slide-bar, and occupies a guide-way in an upstanding portion 10 of a stand 10$^a$, being held down within such guideway by means of a cross-bar 10$^c$, and has a rod-like extension 2$^b$ that passes forward through a hole in a second upstanding portion, 10$^b$, of the stand 10$^a$, and the actuating spring is a coil-spring 9 that is mounted upon the said extension 2$^b$ and confined between upstanding portion 10$^b$ of the stand 10$^a$ and the front end of the body of the slide-bar. The normal position of the slide-bar, given to the same by the action of spring 9 in tending to expand, is determined through contact of lateral projections 2$^a$, 2$^a$, thereof with the front of upstanding portion 10 of the stand 10$^a$. The supporting means for the carrier-stand 10$^a$ may vary in practice. Herein the carrier-stand is supported upon an outward extension 11 from a feeler-stand 11$^a$, which latter is bolted to a bracket 12 projecting outward from loom-frame 13 at one end of the breast-beam. The carrier-stand 10$^a$ is held in position upon extension 11 of feeler-stand 11$^a$ by one or more bolts, and is adjustable thereon in the direction from front to rear, or vice versa, to provide for setting the feeler so that contact of the weft-mass with the feeling-end of the feeler-tip shall take place at the proper point in the beating-up movement of the lay to secure the desired results through the action of the parts. Feeler-stand 11$^a$ is adjustable transversely of the loom along bracket 12 by means of bolts 11$^b$, 11$^b$, and the slots 11$^c$, 11$^c$, in said bracket, in order that the feeling-end 1$^c$ of the feeler-tip may be located so as to make contact with the required portion of the length of the weft-supply and weft-carrier in the shuttle.

The feeler-tip in this instance is of the known type in which the required lateral movement of the feeler-tip is provided for by means of a pivotal connection at 1$^a$ of the feeler-tip with the carrier. The features of the invention are not in all cases restricted to employment in connection with feeler-tips of this particular type. As a convenient feature of construction, the feeler-tip is provided with a stop-lug 1ᵇ that contacts, as in Figs. 1 and 4, with a surface in connection with the carrier-member, when the feeler-tip occupies upon the carrier-member the proper position for presentation to the supply of weft or filling 3 on the weft-carrier 4 contained in the shuttle 5 on the lay. In such presentation-position of the feeler-tip, as heretofore in the said type, the feeling-end, 1ᶜ, thereof is offset laterally with respect to the pivot 1ᵃ, so that forward pressure exerted against such end will tend to swing or rotate the feeler-tip laterally around the said pivot. As in the case of prior feelers of such type, when the weft-supply 3 contained in the shuttle is sufficient in amount and is pressed against such end, as in Fig. 4, the engagement of the turns or coils of yarn with the feeler-end will hold the feeler-tip from swinging or turning outwardly around its pivot under the forward pressure. As sometimes in the case of the said prior feelers, the feeling-end 1ᶜ preferably is slightly toothed or serrated, as shown, in order that the said turns or coils of yarn may act the more effectually to keep the feeler-tip from swinging. The action in these various respects is as heretofore, and as heretofore, also, when the barrel of the weft-carrier 4 contained in the shuttle is denuded of weft, or is so far denuded that the remaining turns or coils of weft upon the said barrel are incapable of holding the feeling-end 1ᶜ from slipping laterally, as in Fig. 5, the pressure of such barrel against the feeling-end causes the latter to slip outward along the barrel so that the feeler-tip assumes the outwardly-swung position in which it is represented in Fig. 5.

As one feature of the invention I employ in conjunction with the laterally-movable feeler-tip 1 a stop-device which is made effective by the rearward movement of carrier 2 to give to the feeler-tip its normal presentation-position for feeling action in connection with the working weft-supply. The said stop-device may vary in construction, arrangement, and application, in practice. In the case of this first embodiment of features of the invention, it consists of a rod $a$, a lug $d$ having a hole through which the rod passes, and a collar $e$ fixed upon the rod. The rod occupies a position alongside the carrier and parallel therewith, and has its rear end joined by a pivot $b$ to a tail $c$, projecting laterally from feeler-tip 1 at the opposite side of the pivot 1ᵃ of said feeler-tip from that at which feeling-end 1ᶜ is located. The lug $d$ is a fixed lug projecting laterally inward from upstanding portion 10 of carrier-stand 10ᵃ, and having a hole through which the forward portion of the rod passes. The collar $e$ is fixed upon the said portion of the rod in front of the said lug by means of a clamping screw $f$. The said collar is so located upon the rod that when carrier 2 is in its normal rearward position, the collar will be in engagement with the front face of the lug $d$, and the feeler-tip will be held thereby in its normal position with its stop-lug 1ᵇ in contact with the adjacent side of carrier 2. Thus, spring 9, in acting to keep carrier 2 in its normal rearward position thereby keeps the collar $e$ in contact with or close to the front face of lug $d$, which insures that lateral stop-lug 1ᵇ of the feeler-tip shall remain in contact with or close to the coacting side of carrier 2, and that the feeler-tip shall occupy its normal position; that is, its presentation-position. If during the first part of the rearward movement of the carrier the feeler-tip should occupy a laterally-displaced position, in which case the rod $a$ will be displaced endwise rearwardly, the collar $e$ will engage with lug $d$ before the completion of the rearward movement of the carrier. The engagement of collar $e$ with lug $d$ will arrest the rearward movement of the rod while that of the carrier continues, and therefore in virtue of the arrest of the rearward movement of the rod, and in consequence of the connection of the rod with the tail of feeler-tip 1, the feeler-tip will be caused to turn inwardly upon the pivot 1ᵃ connecting it with the carrier 2, until the stop-lug 1ᵇ brings up against the adjacent side of the carrier. Thus, the spring 9, rod $a$, collar $e$, and lug $d$, insure that the feeler-tip shall assume its desired presentation-position and retain such position while the carrier is in its normal rearward position. The rod $a$, collar $e$, and lug $d$, constitute therefore a stop-device which in the rearward movement of the carrier operates in connection with the feeler-tip to definitely actuate the feeler-tip and its feeling-end into presentation-position, as in Fig. 1. When the forward movement of the lay carries the working weft-supply 3 against the feeling-end 1ᶜ of the feeler-tip, and the said weft-supply holds the feeler-tip from turning around its pivot 1ᵃ, the rod $a$ and collar $e$ accompany the feeler-tip and carrier in their forward movement indicated in Fig. 4 as having taken place. In doing so the rod slides freely forward through the hole in lug $d$ of the carrier-stand. The stop-device, therefore, permits the feeler-tip to go forward in unison with carrier 2 while retaining its normal presentation-position. In the return movement of the carrier and feeler-tip produced by spring 9 as the lay moves rearward, the rod $a$ simply draws rearward through the hole in lug $d$ until collar $e$ brings up again against the front face of the said lug.

Figure 5:
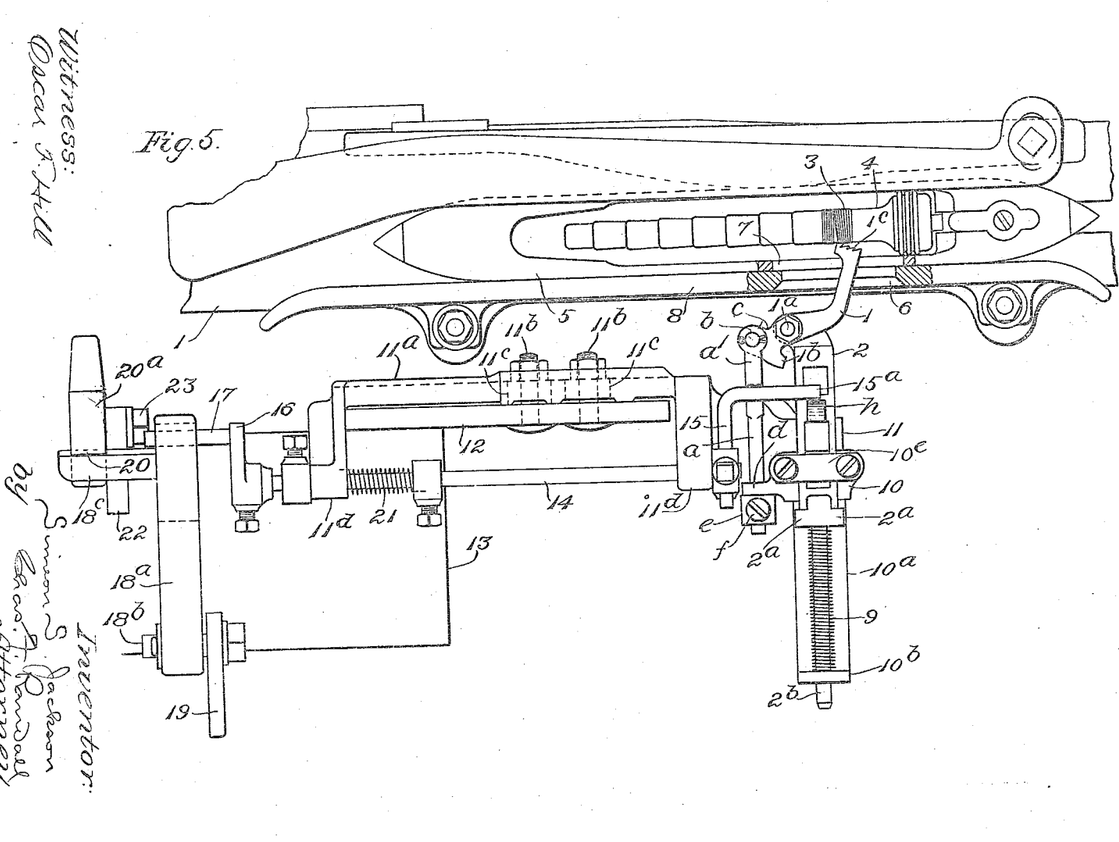
Fig. 5, Sheet 4, is a view corresponding with Fig. 4, but with the supply of weft or filling substantially exhausted and the feeler-tip displaced laterally.
Figure 6:
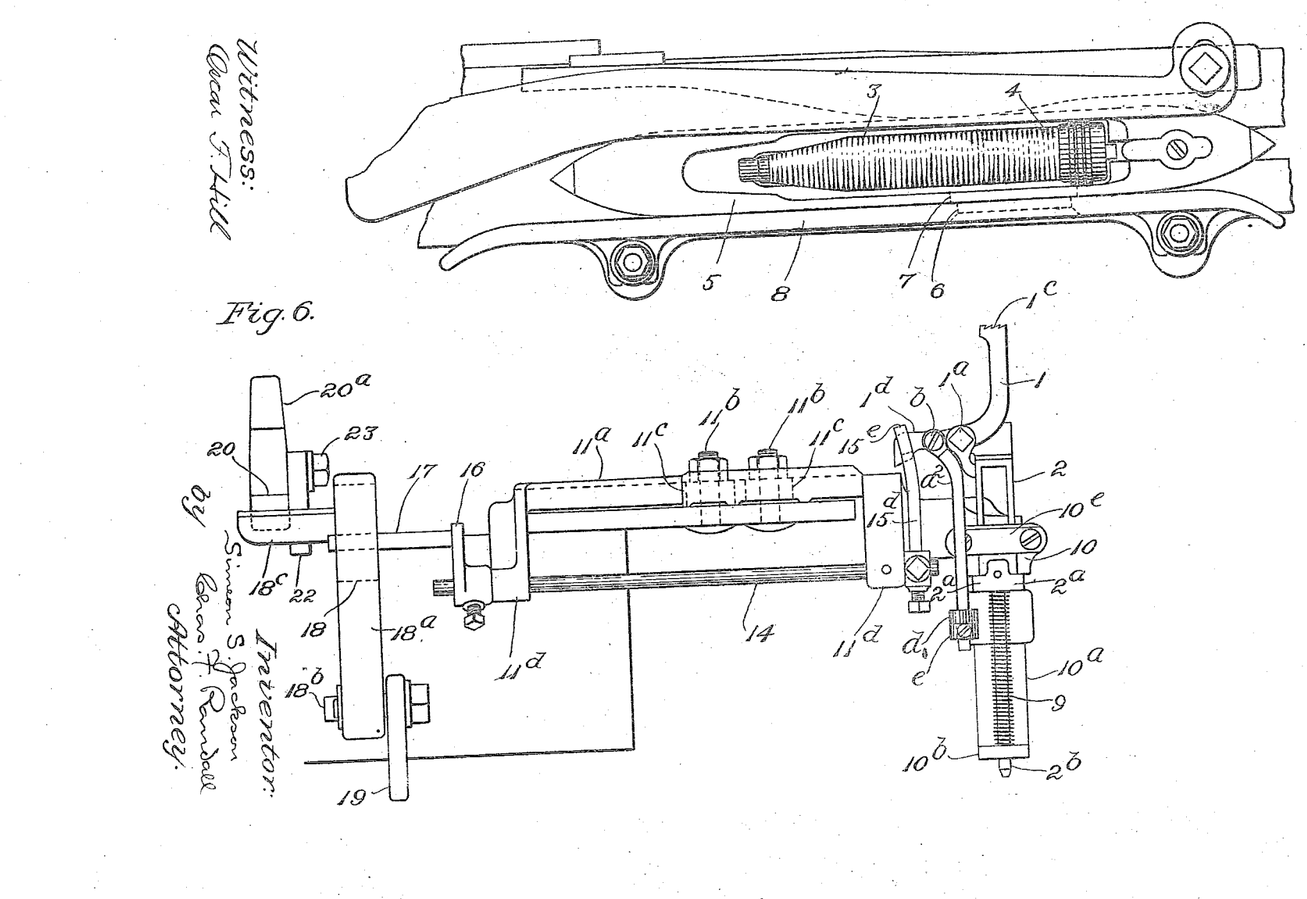
Fig. 6, Sheet 5, is a view corresponding with Fig. 1, but showing a second illustrative embodiment of the invention.
Figure 7:
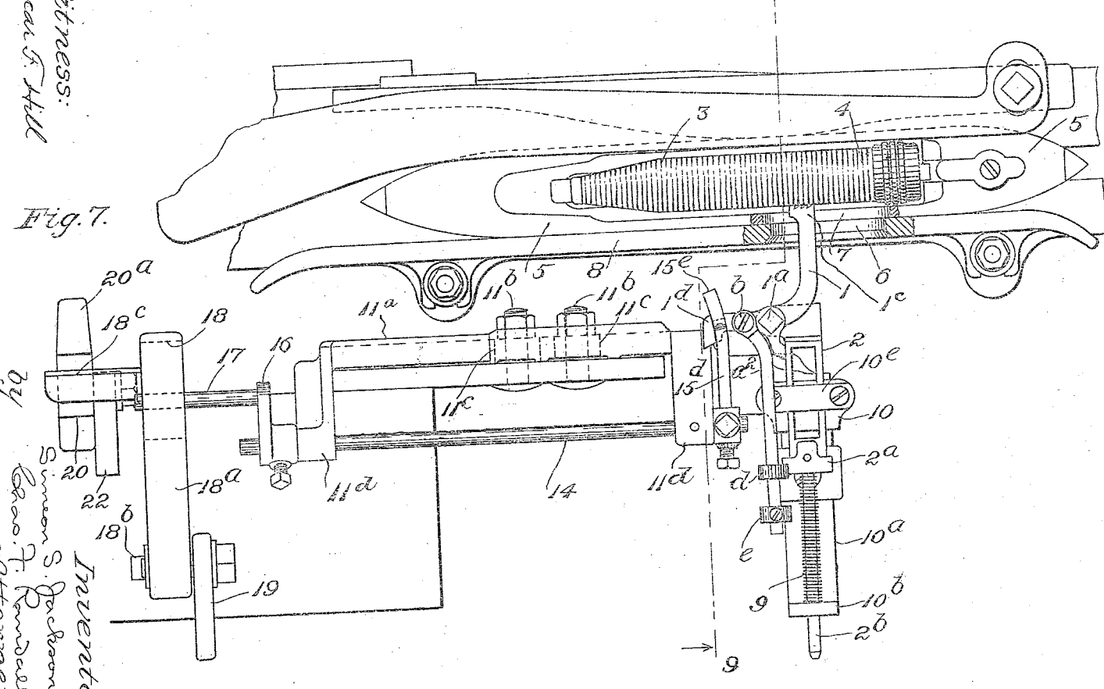
Fig. 7, Sheet 6 is a view like Fig. 4 showing the lay forward.
Figure 8:
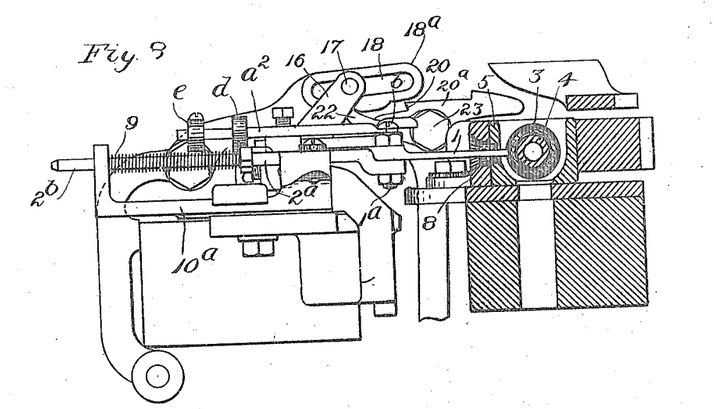
Fig. 8, Sheet 7, is a partly sectional view looking from the right in Fig. 7.

A novel action takes place when the forward pressure of a denuded or substantially denuded portion of a weft-carrier against the feeling-end 1ᶜ deflects the said feeling-end outward as in Fig. 5. During this deflection, the tension of spring 9 tends to keep carrier 2, and consequently the point 1ᵃ of engagement of the feeler-tip therewith, in the most rearward position. The effect of this is that the feeler-tip first tends to swing around pivot 1ᵃ as a fulcrum in the direction to draw rod $a$ rearward. Thereby collar $e$ becomes firmly engaged with the front face of lug $d$. In this manner the rearward position of rod $a$, and that of the pivot $b$ connecting the tail of the feeler-tip with rod $a$, becomes fixed, whereupon the pivot $b$ becomes the effective fulcrum of the feeler-tip and during the remainder of its forward swinging movement the feeler-tip swings around such fulcrum and in doing so acts as a lever applying power at the pivot 1ᵃ to press the carrier 2 forward. The forward movement of the carrier thereby occasioned displaces it forward relative to rod $a$. This relative displacement is utilized for the purpose of bringing about the desired change in the operation of the loom. In effect, the feeler-tip has alternate fulcra, both of which are utilized during the indicating action, namely, a primary fulcrum 1ᵃ in connection with carrier 2, upon which it swings laterally toward and from its normal presentation-position, and a secondary fulcrum $b$ in connection with the stop-device, upon which it swings in acting as a lever to move carrier 2 forward, and in being subsequently restored to presentation-position through the rearward movement of carrier 2 produced by the action of spring 9 as the pressure against the feeler-end 1ᶜ of the feeler-tip is relieved by the movement of the lay rearward.

The operation of the loom in which the feeler is employed is governed by the feeler-parts that have been described, through supplemental devices which are governed directly by the said feeler-parts. In general terms, so long as the said feeler-parts are driven forward by the push of the filling-mass with the feeler-tip in its normal position shown in Fig. 4, no change in the operation of the loom is occasioned, but when the forward movement takes place with the feeler-tip laterally-displaced as in Fig. 5 by the push of a substantially exhausted weft-carrier 4, so that the action just described takes place, the desired change in such operation is brought about. The said supplemental devices may vary in character and arrangement, and may include any suitable form of controller or transmitter. The drawings show a well-known form of controller, operatively combined with the feeler and governed thereby, and itself controlling a catch 18ᵃ arranged for coaction with a striker. The striker is constituted in this instance by the weft-hammer 20ᵃ of the loom, and the said catch is connected at its front end by a pivot 18ᵇ with an arm 19 belonging to the parts that are concerned the more immediately in bringing about the change in the operation of the loom.

The illustrated form of controller comprises a rockshaft 14 that is mounted in bearings 11ᵈ, 11ᵈ, provided in connection with feeler-stand 11ᵃ; an arm 15 fixed upon the outer end-portion of the said rockshaft and provided with an outwardly-projecting pin 15ᵃ for coöperation with the feeler-parts; and an arm 16 fixed upon the inner end portion of the said rockshaft and carrying an inwardly-projecting pin 17 which enters a slot 18 in the catch 18ᵃ. The height at which the said pin 17 is held as the weft-hammer makes its forward stroke determines whether the lateral spur 18ᶜ of said catch shall be engaged by the shoulder 20 of the weft-hammer and the catch and arm thereby be thrust forwardly to bring about the predetermined change in the operation of the loom. The coöperation of the feeler-parts with crank-pin 15ᵃ locks the controller in a position which causes it to hold the catch 18ᵃ out of the path of shoulder 20 at the time of the said forward stroke of the weft-hammer. A spring 21 applied in connection with rockshaft 14 acts with a tendency to rotate or assist in rotating the said rockshaft in the direction to cause or permit the spur 18ᶜ to enter into the path of the shoulder 20.

Figure 1:
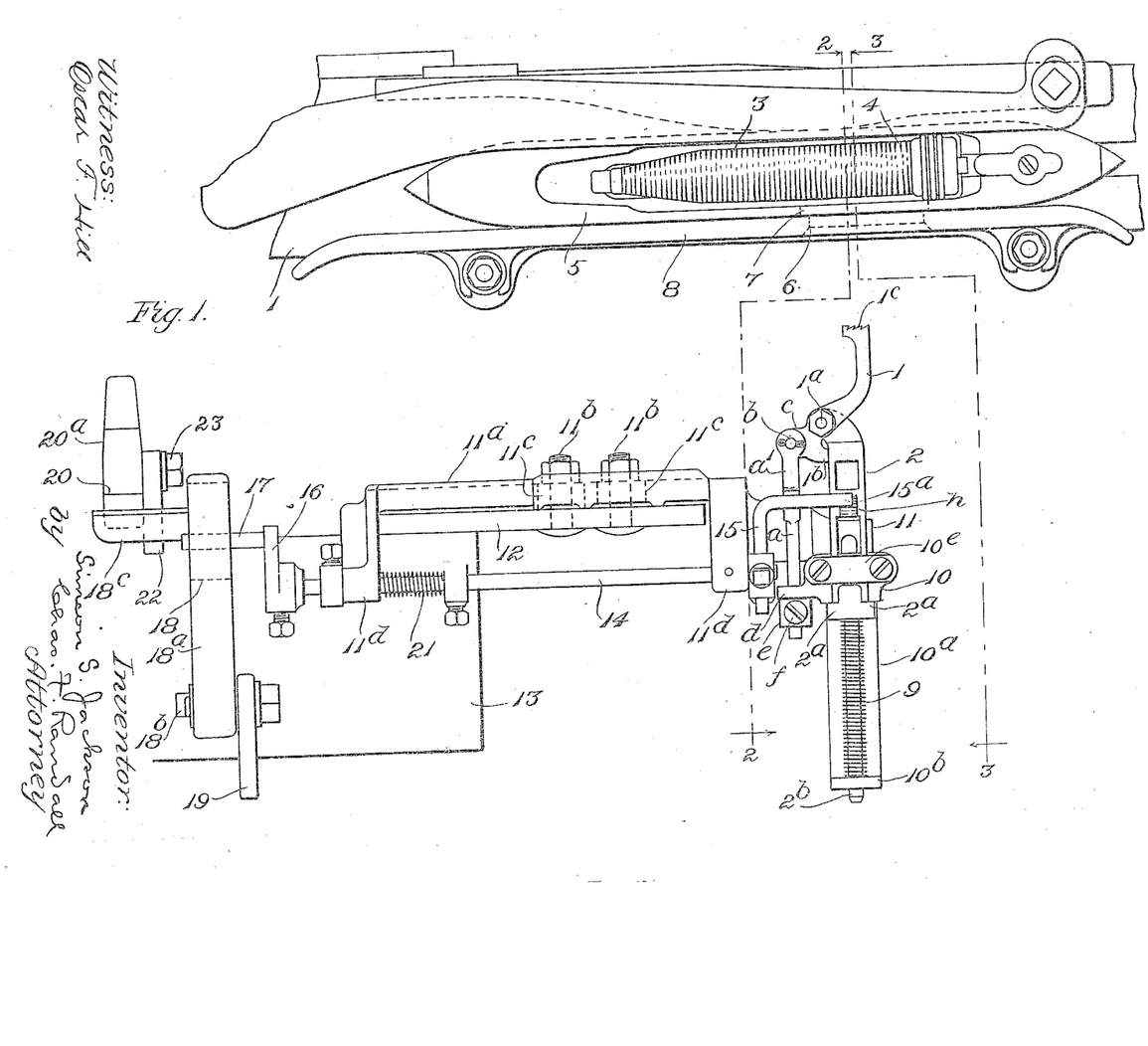
Figure 1 is a plan view showing one illustrative embodiment of the invention, together with portions of the lay and frame of a loom, with a shuttle in place on the lay in position for making presentation of its contained weft-supply to the feeling end of the feeler-tip, the lay being in a rearward position, and a full supply of weft or filling being contained in the shuttle.
Figure 2:
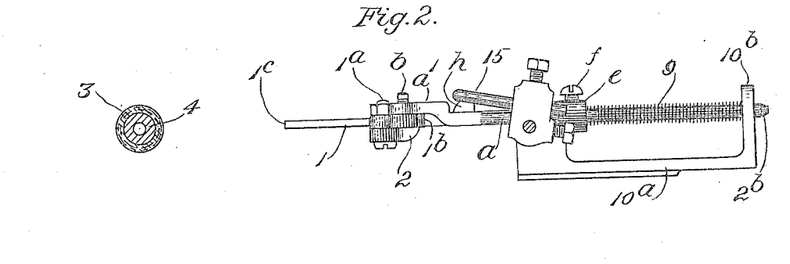
Fig. 2, Sheet 2, is a view showing the parts at the right of the line 2, 2, in Fig. 1, certain parts being in vertical section on such line, and the lay and shuttle being omitted.
Figure 3:
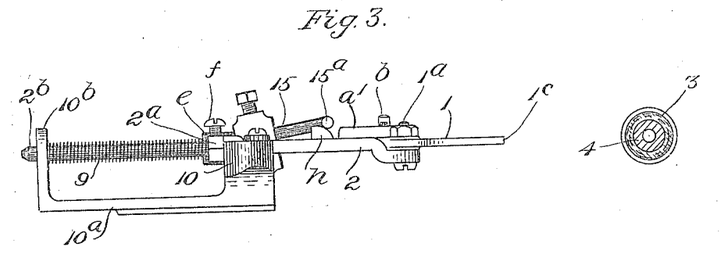
Fig. 3, Sheet 2, is a view looking from right to left in Fig. 2, the bobbin being in vertical section on line 3, 3.
Figure 4:
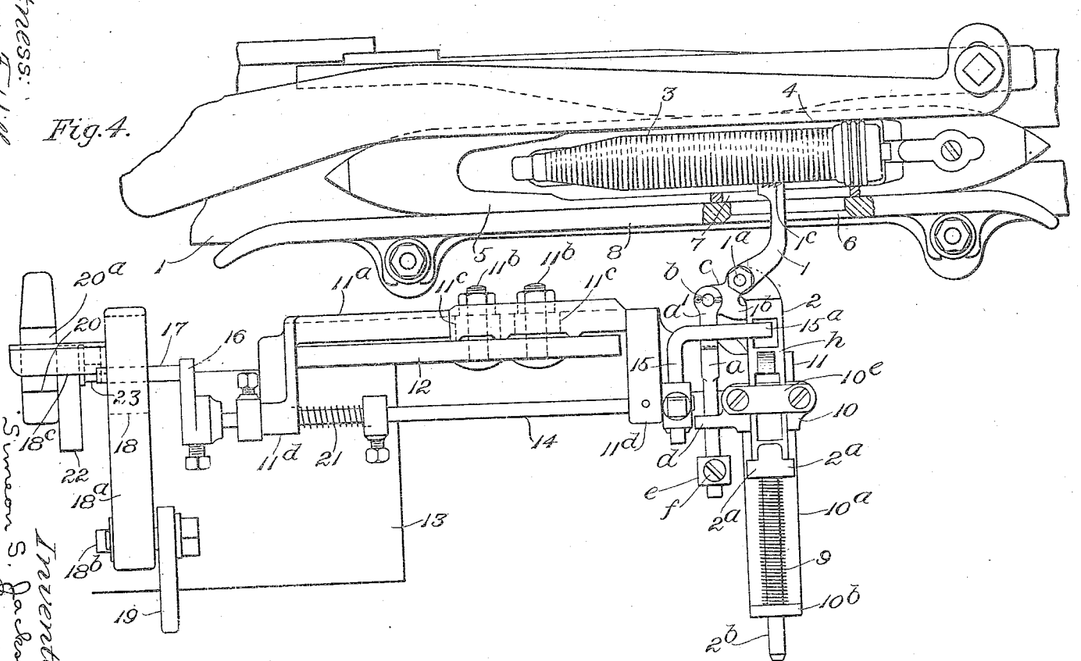
Fig. 4, Sheet 3, is a plan view like Fig. 1, but with the lay in a forward position, and with portions of the front-plate of the shuttle-box and the front wall of the shuttle-body broken away.

The new mode of governing the so-called controller or transmitter of the feeler-devices of a loom through a feeler having a laterally movable feeler-tip consists in employing in conjunction with the laterally movable feeler-tip a controller-lock or detent which, while the working weft-supply is sufficient to hold the feeler-tip from lateral displacement, locks the controller or transmitter so as to prevent a change in the operation of the loom from being indicated or called, but which, when the extent of depletion of the working weft-supply becomes such that lateral movement of the feeler-tip takes place, unlocks the controller or transmitter so that the mechanism is permitted to indicate or call the change. In this first illustrated embodiment of features of the invention, the controller-lock or detent comprises a locking member $a'$ upon the rod $a$, which locking member coöperates with the crank-pin 15ᵃ of arm 15 of the controller. The locking member $a'$ is a raised portion of the rear part of the rod $a$. When the lay is back and the feeler-parts occupy their normal positions shown in Figs. 1, 2, 3, the locking member $a'$ is in its idle or inoperative position at the rear of the crank-pin 15ᵃ and clear of the latter but with its front end closely adjacent thereto. So long as the locking-member $a'$ remains entirely at the rear of the crank-pin 15ᵃ it will not prevent the controller from turning in the direction to lower the catch 18ᵃ, when the controller is free otherwise to turn in such direction after previously having occupied a position in which it supports catch 18ᵃ clear of the path of the engaging shoulder 20 of the weft-hammer 20ᵃ. In operation, each time the advancing weft-mass 3 pushes against the feeling-end 1ᶜ of feeler-tip, and, while holding the feeler-tip from lateral displacement as in Fig. 4, drives the feeler parts bodily forward in unison, the forward movement carries the locking member a′ forward under the elevated crank-pin so as to lock the controller thereby with catch 18ᵃ elevated. To facilitate the entrance of the locking member a′ into locking position under the crank-pin 15ᵃ, the front corner of the said locking-member is rounded off as shown in Figs. 2 and 3. As the lay recedes from its position in Fig. 4 and spring 9 returns the feeler-parts rearward, the rearward movement of the feeler-parts draws the locking member a′ out of engagement with the crank-pin 15ᵃ and returns it to its idle or inoperative position. When, however, the forward pressure of a substantially denuded weft-carrier 4 against feeling-end 1ᶜ of the feeler-tip 1 deflects the feeler-tip laterally outward so that the feeler-tip swings around pivot b as a fulcrum and forces carrier 2 forward while holding rod a rearward with stop collar e in contact with the front face of lug d, the locking member a′ is caused to remain in unlocking position. Hence the controller remains unlocked and consequently is permitted to turn so that catch 18ᵃ is lowered and engagement between catch 18ᵃ and the weft-hammer is permitted to take place, so that the change in the operation of the loom is called.

In the case of the described construction the locking member a′ normally occupies its unlocking position at the rear of crank-pin 15ᵃ, and when the controller is permitted to do so it assumes a position in which the crank-pin 15ᵃ is down in front of said locking-member and catch 18ᵃ is lowered.

I provide resetting means acting prior to every feeling action and adapted to rock the controller reversely so as to raise the catch 18ᵃ and the crank-pin 15ᵃ in case they should occupy depressed positions. Thereby the crank-pin 15ᵃ is raised high enough to permit the locking member a′ to pass under the crank-pin at the appointed time. This means comprises in the present instance a small cam 22 that is fixed by a bolt 23 to the weft-hammer in position to act against the spur 18ᶜ of catch 18ᵃ from beneath. In the rearward movement of the weft-hammer this resetting cam engages the catch. The raising of the catch rocks or turns the controller reversely and thereby raises the crank-pin. The weft-hammer and resetting-cam remain rearward until just prior to the completion of the forward movement of the lay. Thus the resetting-cam upholds the catch 18ᵃ and the crank-pin 15ᵃ of the controller until after the lock or detent a′ has been moved forward into locking position under said crank-pin during the regular working of the feeler. In the forward beat of the weft-hammer the acting portion of the elevator-cam passes forward away from spur 18ᶜ so as not to obstruct the catch in the descent of the latter in case the controller should be unlocked. The said forward beat takes place during the final portion of the advance of the lay. The release of the catch by the forwardly moving elevator-cam takes place in season to permit the spur 18ᶜ of the catch to enter within the path of movement of the shoulder 20 of the weft-hammer, and be engaged thereby, in case the lock or detent should not be moved into locking position by the beat-up of the lay. The resetting-cam may be adjusted by turning it around its securing bolt so as to raise or lower the portion thereof which acts against the spur 18ᶜ, to increase or decrease the extent of lift of the catch 18ᵃ and crank-pin 15ᵃ as may be required. If desired, the weft-hammer or resetting-cam may be slotted to permit the resetting-cam to be shifted forward or backward to vary the timing of the raising action and of the subsequent release of the catch by the resetting-cam.

For the purpose of preventing a change in the operation of the loom from being called needlessly while the loom in which the hereinbefore-described feeler-device is employed is being turned over for pick-finding purposes with the shuttle removed from the lay, I provide a controller-rest which acts like the controller-lock to lock the controller from operating to place catch 18ᵃ in position to be engaged by the weft-hammer. In the absence of the shuttle and its weft-contents at the beat-up of the lay on which the feeling action ordinarily occurs, a change would be indicated or called unless provision were made to prevent this from being done. The controller-rest attains that end. In this embodiment of the invention, the controller-rest is constituted by an upstanding lug or projection h upon carrier 2. In the normal rearward position of the carrier, as in Figs. 1, 2, 3, this lug or projection is located under the crank-pin 15ᵃ and supports the latter, and thereby keeps the controller in a position in which it holds catch 18ᵃ raised relative to the weft-hammer. The controller-rest remains rearward under and in engagement with the crank-pin 15ᵃ until the carrier is moved forward by pressure exerted against the feeling-end of the feeler-tip in the feeling action. Consequently the controller is locked normally by the said detent, and it remains locked thereby while the loom is turned over without any shuttle on the lay in finding the pick. During the regular working of the loom the forward movement of carrier 2 that is produced by the push of the contents of the shuttle at every feeling action takes the controller-rest forward out of engagement with crank-pin 15$^a$. Thereby the controller is freed so that it may turn unless locked by the action of the locking member $a'$.

Figure 9:
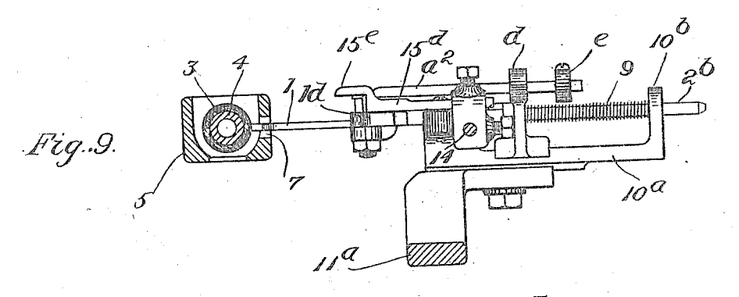
Fig. 9, Sheet 7, is a view partly in vertical section on substantially the line 9, 9, of Fig. 7, looking from the left in the latter figure, but with the lay omitted.
Figure 10:
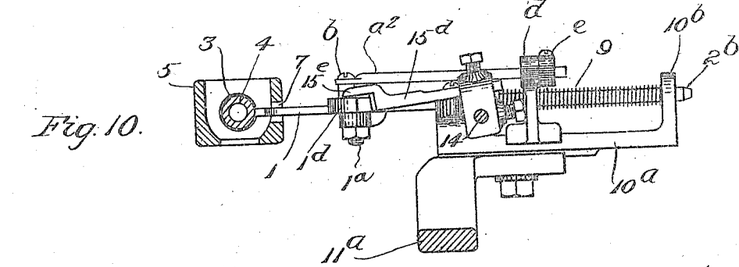
Fig. 10, Sheet 7, is a view similar to Fig. 9, but with the supply of weft or filling substantially exhausted.
Figure 11:
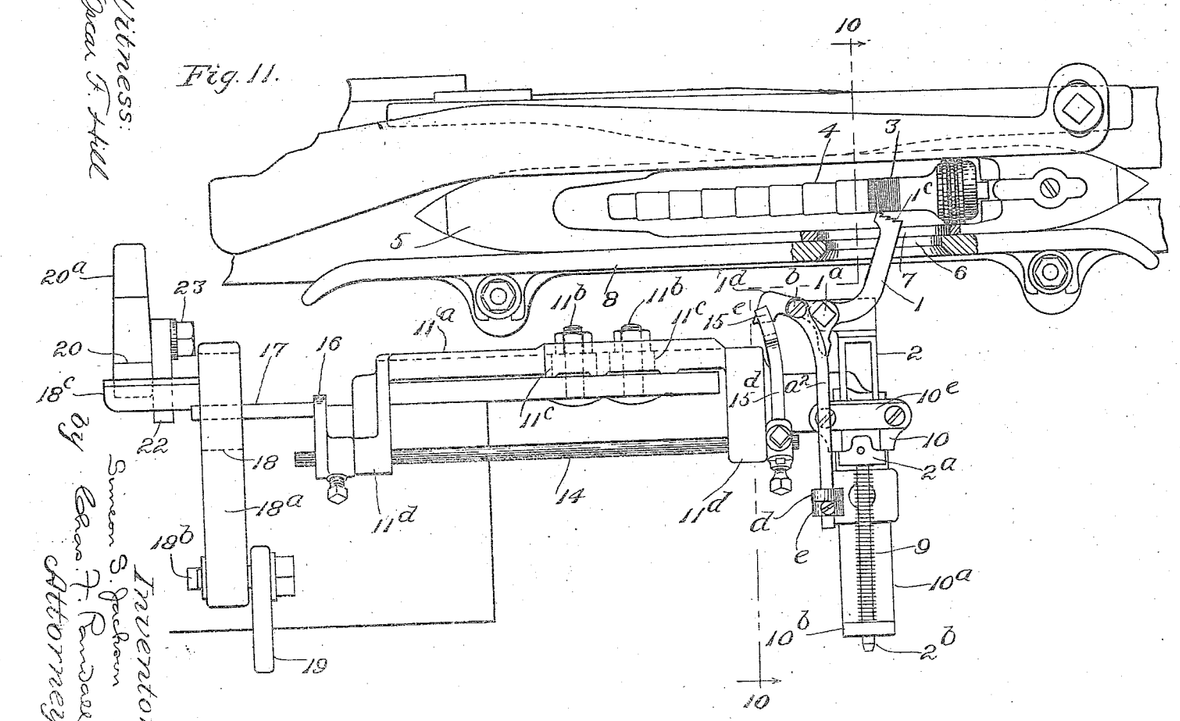
Fig. 11, Sheet 8, is a view corresponding with Fig. 7, showing a substantially exhausted supply of weft or filling.
Figure 12:
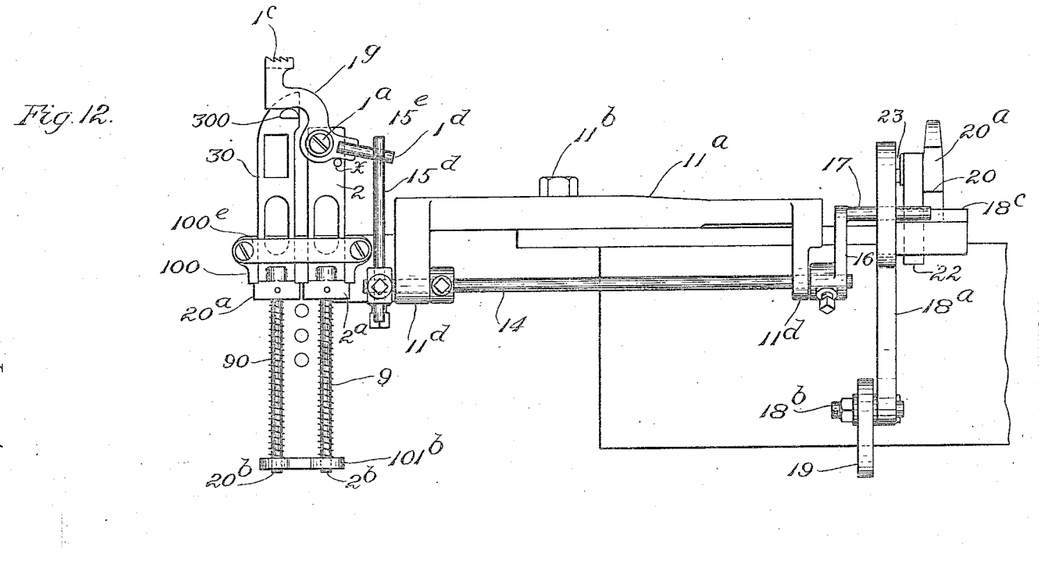
Fig. 12, Sheet 9, is a view corresponding with Fig. 1, but showing a third illustrative embodiment of the invention.

In the case of the second embodiment of features of the invention, as shown in Figs. 6 to 11, Sheets 5 to 8, the controller-lock and controller-rest are transferred to and combined with the feeler-tip. That is to say, the feeler-tip is so constructed and so combined operatively with the controller that the feeler-tip performs the functions that in the first embodiment are performed by the separate controller-lock and controller-rest. Thus, the tail of the feeler-tip is furnished with an extension 1$^d$ with which the arm 15$^d$ of the controller engages. Normally, the said extension projects under the rear end of the said arm which rests upon the said extension 1$^d$ and is supported thereby as in Fig. 6, and substantially as shown in Fig. 9. Thereby the controller is locked with the catch 18$^a$ in a raised position. Forward movement communicated to the feeler-parts by pressure of the filling-mass against the feeling-end of the feeler-tip, carrying them bodily forward in unison without deflection of the feeler-tip, carries the extension 1$^d$ farther forward under the arm 15$^d$ as in Figs. 7 and 9. The return movement of the feeler-parts as the lay recedes restores the extension to its position under the rear end of the arm as in Fig. 6. When the pressure of a substantially denuded weft-carrier against the feeling-end 1$^c$ operates to deflect or displace the feeler-tip as in Fig. 11, the turning of the feeler-tip around the secondary fulcrum $b$ operates to swing the extension 1$^d$ rearward, out from under the end of the arm 15$^d$ and releases the said arm, as shown in Figs. 10 and 11. Upon the release of the arm the controller turns until a finger 15$^e$ projecting rearwardly from the top of the arm comes to rest upon the top of the extension 1$^d$ as in Figs. 10 and 11. This turning movement permits the catch 18$^a$ to move into position to be engaged by the shoulder 20 of the forwardly moving weft-hammer, to call the change in the operation of the loom. In the subsequent rearward stroke of the weft-hammer the resetting cam 22 raises the catch and rocks the controller reversely, thereby raising arm 15$^d$ high enough to permit extension 1$^d$ of the feeler-tip to swing in under the arm as the feeler-parts recover their normal positions under the action of spring 9 and stop-device $a^2$, $d$, $e$.

The controller-actuating spring 21 of the first embodiment may be omitted, as in the case of the illustration of the second embodiment. In the absence of the said spring the movement of the controller, when the latter is unlocked through the disengagement of extension 1$^d$ from arm 15$^d$, is due entirely to the action of gravity. A spring 21 may be employed in the second embodiment if preferred.

The third embodiment, shown in Figs. 12 to 16, differs from the second embodiment in the replacement of the stop-device $a^2$, $d$, $e$, by a spring-actuated slide 30. The slide 30 acts to hold the feeler-tip normally in its presentation-position. It is arranged alongside carrier 2, and like the latter is mounted in a guideway in the carrier-stand 100, the reduced rod-like extensions 2$^b$, 20$^b$, of the two parts being passed through holes in the forward upright portion 101$^b$ of the carrier-stand, and the actuating springs 9, 90, surrounding the said extensions being confined between said upright portion 101$^b$ and the front ends of the body-portions of the carrier and slide. A single cross-bar 100$^c$ serves to hold the two parts within their guideways. The slide 30 engages by means of a lug or projection 300 upon its rear end with the feeler-tip, and the pressure transmitted to the feeler-tip through this lug or projection operates with a tendency to turn the feeler-tip upon its fulcrum 1$^a$ in connection with the carrier so as to hold the feeler-tip against a stop-pin $x$ upon the carrier. Thereby the feeler-tip is given its presentation-position, and extension 1$^d$ of the tail of the feeler-tip is kept normally beneath the rear end of arm 15$^d$ so that it supports such arm and locks the controller from turning to lower the catch 18$^a$.

Figure 13:
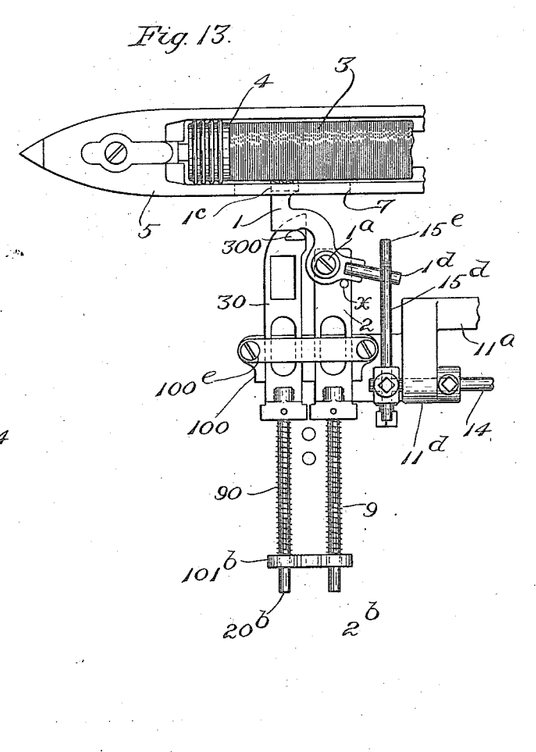
Fig. 13, Sheet 10, is a plan view of the parts at the left in Fig. 12, omitting the lay, and with the shuttle forward and the mass of weft or filling engaged with the feeler-tip.
Figure 14:
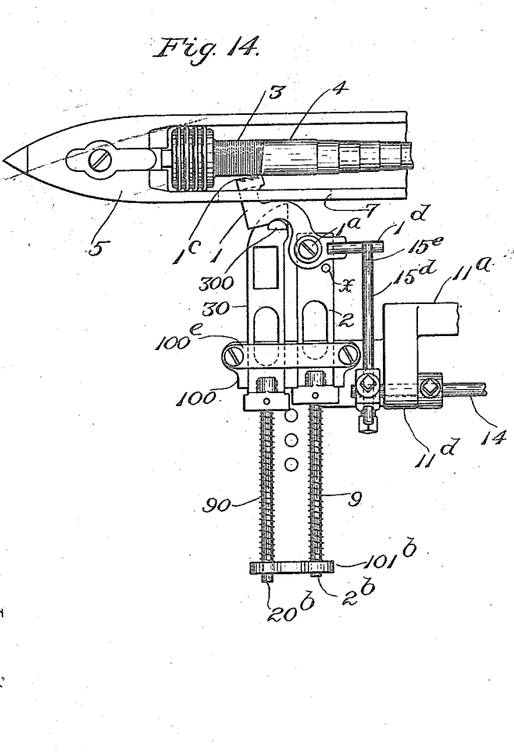
Fig. 14, Sheet 10, is a view similar to Fig. 13, but showing the said mass substantially exhausted.
Figure 15:
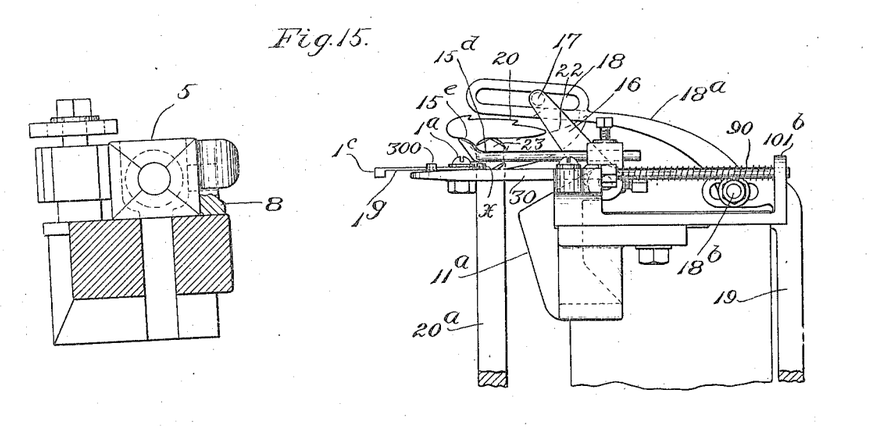
Fig. 15, Sheet 11, is a view in elevation from the left in Fig. 12.
Figure 16:
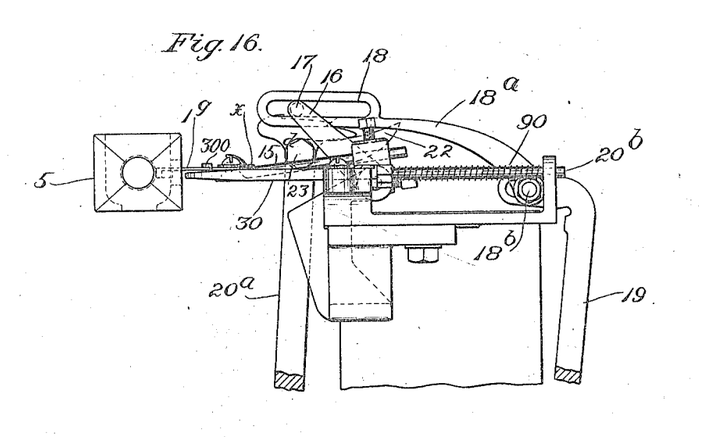
Fig. 16, Sheet 11, is a view corresponding substantially with Fig. 15, omitting the lay, and with the shuttle forward for the feeling action.

When the forward movement of the lay carries against the feeling-end 1$^c$ of the feeler-tip a weft-mass sufficient in quantity to prevent lateral displacement of the feeler-tip from taking place, and the feeler parts in consequence are forced forward without such lateral displacement, the pressure that is transmitted through the feeler-tip against the lug or projection 300 of slide 30 will cause the slide to go forward in unison with carrier 2, as in Fig. 13. As the lay recedes, spring 90 will carry the slide 30 rearward in unison with the carrier 2, so that projection 300 by its pressure against the feeler-tip will keep the latter pressed against stop-pin $x$. The action otherwise will be substantially as in the case of the second embodiment. When a substantially depleted weft-carrier is carried forward against feeling-end 1$^c$ and displaces the feeler-tip laterally as in Fig. 14, the lug or projection 300 will become a secondary fulcrum for the feeler-tip.

The forward pressure exerted against feeling-end 1ᶜ will operate through the intermediate portion of the feeler-tip to press slide 30 forward against the resistance offered by spring 90, while in consequence of such resistance the feeler-tip will tend to turn around projection 300 so that carrier 2 will be held in its rearmost position. At the same time, the feeler-tip will turn somewhat upon its pivotal connection with carrier 2 so that extension 1ᵈ will be swung rearward out from under the rear end of arm 15ᵈ and the controller will be permitted to turn until the finger-like extremity 15ᵉ of the arm lands upon the top of the said extension. As the lay recedes, the relative rearward movement of slide 30 caused by spring 90 will act through lug or projection 300 to swing the feeler-tip reversely around its pivot 1ᵇ upon carrier 2 into its original position in Fig. 12.

In the case of the first and second embodiments of the invention I shall employ in some cases a spring acting in connection with the feeler-tip to cause it to resume its normal or presentation-position. When such spring is employed, while the stop-device will assist in fixing the said position for the feeling action, its more important function will be to determine the position of the secondary fulcrum.

I claim as my invention:—

1. A weft-feeler having a movable carrier, a laterally-movable feeler-tip provided with a primary fulcrum in connection with said carrier and upon which it turns into presentation-position, and a secondary fulcrum for said feeler-tip, upon which it turns when the weft or filling is substantially exhausted.

2. A weft-feeler having a movable carrier, a laterally-movable feeler-tip provided with a primary fulcrum in connection with said carrier and upon which it turns into presentation-position, and a secondary fulcrum for said feeler-tip by which it is given its presentation-position for the feeling-action, and upon which it turns in indicating substantial exhaustion.

3. A weft-feeler having a movable carrier, a laterally-movable feeler-tip carried thereby, and a member permitting said feeler-tip to accompany the carrier in the feeling-action so long as held in presentation-position by the weft or filling, and with which as a bearing the feeler-tip coacts during lateral displacement to indicate as a result of such displacement the substantial exhaustion of the weft or filling.

4. A weft-feeler having a movable carrier, a laterally-movable feeler-tip provided with a primary fulcrum in connection with said carrier and upon which it turns into presentation-position, and a secondary fulcrum for said feeler-tip, movable in unison with the carrier during the feeling-action, operative to give the feeler-tip its presentation-position for the feeling-action, and upon which the feeler-tip turns in indicating substantial exhaustion of the weft or filling.

5. A weft-feeler comprising a movable carrier and a laterally-movable feeler-tip carried thereby and having alternate fulcra, upon one of which the feeler-tip turns to assume presentation-position for the feeling-action, and upon the other of which it turns during lateral displacement in case of substantial exhaustion of weft or filling, to thereby indicate such stage of exhaustion.

6. A weft-feeler comprising a movable carrier, a feeler-tip laterally-displaceable thereon, and a stop-device including a member having a limited extent of movement in unison with the carrier and which provides a fulcrum for the feeler-tip as the latter shifts laterally under pressure when the weft or filling is substantially exhausted.

7. A weft-feeler comprising a movable carrier, a laterally-displaceable feeler-tip fulcrumed thereon, and a stop-device comprising a rod in pivotal engagement with said feeler-tip, a stop-member carried by said rod, and a stationary stop-member with which the first stop member engages to determine the extent of rearward movement of the rod.

8. Weft-feeler devices comprising a controller, a movable carrier, a laterally-displaceable feeler-tip carried thereby, and a controller-lock operatively combined with the feeler-tip and which unlocks the controller when the feeler-tip is laterally displaced in case of substantial exhaustion of the weft or filling.

9. Weft-feeler devices comprising a controller, a movable carrier, a laterally-movable feeler-tip having a fulcrum on said carrier, and a controller-lock operatively combined with the feeler-tip and rendered inoperative by the turning of the feeler-tip upon said fulcrum in case of substantial exhaustion of the weft or filling.

10. Weft-feeler devices comprising a controller, a movable carrier, a laterally-movable feeler-tip carried by said carrier, and a controller-lock operatively combined with the feeler-tip, accompanying the same in the movements of the carrier while the weft or filling is sufficient in amount, and rendered inoperative, whereby the controller is rendered operative, by lateral displacement of the feeler-tip in case of substantial exhaustion of the weft or filling.

11. Weft-feeler devices comprising a controller, a movable carrier, a laterally movable feeler-tip provided with a primary fulcrum in connection with said carrier and upon which it turns into presentation-position, and a secondary fulcrum for said feeler-tip upon which it turns when the weft or filling is substantially exhausted, and a controller-lock operatively combined with the feeler-tip and which unlocks the controller when the feeler-tip turns upon the said secondary fulcrum.

12. Weft-feeler devices comprising a controller having a detent, a weft-feeler, a controller-lock operatively combined with the feeler, normally occupying a position out of engagement with the detent of the controller, and adapted to be engaged with the said detent by the feeling action when sufficient weft is present, and resetting means for the controller acting alternately with the feeling action.

13. Weft-feeler devices comprising a controller having a detent, a weft-feeler, a controller-lock operatively combined with the feeler, normally occupying an inoperative position relative to the detent and controller and adapted to be engaged with the said detent by the feeling action when sufficient weft is present, and a weft-hammer acting to reset the controller in alternation with the feeling action in case said detent should occupy an unset position.

14. Weft-feeler devices comprising a controller, a movable carrier, a laterally displaceable feeler-tip carried by said carrier, a controller-lock operatively combined with the feeler-tip and rendered operative by the feeling action when sufficient weft is present, and resetting means for the controller acting alternately with the feeling action.

15. Weft-feeler devices comprising a controller, a weft-feeler, a controller-lock operatively combined with the feeler, normally inoperative and rendered operative by the feeling action when sufficient weft is present, and means operative to lock the controller out of action when the feeling action is intermitted.

16. Weft-feeler devices comprising a controller, a weft-feeler, a controller-lock operatively combined with the feeler, normally inoperative and rendered operative by the feeling-action when sufficient weft is present, and means to lock the controller out of action when the feeling action is intermitted said means operatively combined with the feeler and rendered inoperative by the feeling action.

17. Weft-feeler devices comprising a controller, a movable carrier, a laterally displaceable feeler-tip carried by said carrier, a controller-lock operatively combined with the feeler-tip and rendered operative by the feeling action when sufficient weft is present, and means connected with said carrier operating to lock the controller out of action when the feeling action is intermitted and operated to unlock the controller by the movement of the carrier due to the feeling action.

18. Weft-feeler devices comprising a controller, a movable carrier, a laterally movable feeler-tip having a fulcrum on said carrier, a controller-lock operatively combined with the feeler-tip and rendered inoperative by the turning of the feeler-tip upon said fulcrum in case of substantial exhaustion of the weft or filling, and means operated by the carrier to lock the controller out of action when the feeling action is intermitted and unlock the controller through the feeling action.

19. Weft-feeler devices comprising a controller, a movable carrier, a laterally movable feeler-tip provided with a primary fulcrum in connection with said carrier and upon which it turns into presentation-position, and a secondary fulcrum for said feeler-tip upon which it turns when the weft or filling is substantially exhausted, the said feeler-tip in turning upon said secondary fulcrum actuating the carrier, a controller-lock operatively combined with the feeler-tip and which unlocks the controller when the feeler-tip turns upon said secondary fulcrum, and means operated by the carrier to lock the controller out of action when the feeling-action is intermitted and operated to unlock the controller by the movement given to the carrier by the feeler-tip in turning upon the secondary fulcrum.

20. Weft-feeler devices comprising a controller, a movable carrier, a laterally displaceable feeler-tip carried by said carrier, a controller lock operatively combined with the feeler-tip and rendered operative by the feeling action when sufficient weft is present to lock the controller out of action, means operated by the carrier to lock the controller out of action when the feeling action is intermitted and operated to unlock the controller by movement of the carrier when the feeler-tip is laterally displaced, and resetting means for the controller acting alternately with the feeling-action.

In testimony whereof I affix my signature in presence of two witnesses.

SIMEON S. JACKSON

Witnesses:
CHAS. F. RANDALL,
ELLEN O. SPRING.